US012694783B2

(12) United States Patent
Kikuchi

(10) Patent No.: US 12,694,783 B2
(45) Date of Patent: Jul. 28, 2026

(54) VEHICLE DETERMINATION DEVICE

(71) Applicant: TOYOTA JIDOSHA KABUSHIKI KAISHA, Toyota (JP)

(72) Inventor: Takuro Kikuchi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/007,985

(22) Filed: Jan. 2, 2025

(65) Prior Publication Data

US 2025/0308384 A1 Oct. 2, 2025

(30) Foreign Application Priority Data

Apr. 2, 2024 (JP) ................................ 2024-059662

(51) Int. Cl.
*G08G 1/095* (2006.01)
*G08G 1/04* (2006.01)
*G08G 1/0962* (2006.01)

(52) U.S. Cl.
CPC .................................... *G08G 1/095* (2013.01)

(58) Field of Classification Search
CPC ....... G08G 1/095; G08G 1/04; G08G 1/09623
See application file for complete search history.

(56) References Cited

U.S. PATENT DOCUMENTS 6,554,089 B2 * 4/2003 Sato .................. B60K 31/0008 180/169
10,220,850 B2 * 3/2019 Naserian ............... F02D 41/042
10,427,689 B2 10/2019 Tokimasa et al.
10,486,698 B2 11/2019 Masui et al.
10,731,996 B2 8/2020 Naito
10,922,561 B2 2/2021 Ozawa et al.
11,017,247 B2 5/2021 Hayashi et al.
11,072,328 B2 7/2021 Masui et al.
11,235,766 B2 2/2022 Masui et al.
11,247,671 B2 2/2022 Komori
2001/0004028 A1 * 6/2001 Sato .................. B60K 31/0008 180/165
2003/0093210 A1 * 5/2003 Kondo ............... B60K 31/0008 701/96
2010/0305804 A1 * 12/2010 Taguchi ................. G08G 1/166 701/31.4
2013/0110371 A1 * 5/2013 Ogawa .................. G08G 1/095 701/1

(Continued)

FOREIGN PATENT DOCUMENTS

JP 5088349 B2 * 12/2012 ............... G06F 7/00
JP 2021-018737 A 2/2021

OTHER PUBLICATIONS

JP-5088349-B2 translation (Year: 2012).*

*Primary Examiner* — Frederick M Brushaber
(74) *Attorney, Agent, or Firm* — SoraIP, Inc.

(57) ABSTRACT

The processor of ECU includes: a traffic light determination unit that determines whether or not a traffic light in front of the vehicle indicates that the vehicle can pass; an other-vehicle behavior determination unit that determines the behavior of the other vehicle existing in the vicinity of the vehicle; and a passableness determination unit that, when it is determined that the traffic light indicates that the vehicle can pass, determines whether or not the traffic light can pass by the vehicle based on the behavior of the other vehicle existing in the vicinity of the vehicle.

5 Claims, 4 Drawing Sheets

(56) References Cited

U.S. PATENT DOCUMENTS

| | | | | |
|---|---|---|---|---|
| 2013/0270395 | A1* | 10/2013 | Steffen, II | B61L 29/226 246/125 |
| 2013/0293395 | A1* | 11/2013 | Ohama | G08G 1/166 340/904 |
| 2016/0155329 | A1* | 6/2016 | Goto | G08G 1/096716 340/903 |
| 2016/0167580 | A1* | 6/2016 | Hanita | B60Q 9/008 701/301 |
| 2016/0189552 | A1* | 6/2016 | Hilleary | B61L 29/22 246/125 |
| 2018/0001894 | A1* | 1/2018 | Masui | B60W 30/16 |
| 2019/0027036 | A1* | 1/2019 | Mishina | B60W 30/09 |
| 2019/0088148 | A1* | 3/2019 | Jacobus | G08G 1/005 |
| 2019/0135317 | A1* | 5/2019 | Hilleary | G01S 13/62 |
| 2020/0193818 | A1* | 6/2020 | Cross | G08G 1/087 |
| 2020/0242922 | A1* | 7/2020 | Dulberg | G08G 1/166 |
| 2020/0255029 | A1* | 8/2020 | Matsunaga | G05D 1/0231 |
| 2020/0255033 | A1* | 8/2020 | Matsunaga | B60W 30/18145 |
| 2020/0326191 | A1 | 10/2020 | Naito | |
| 2021/0027076 | A1 | 1/2021 | Hayashi et al. | |
| 2021/0039647 | A1* | 2/2021 | Fukumoto | B60W 30/16 |
| 2021/0364631 | A1 | 11/2021 | Hasegawa et al. | |
| 2022/0308210 | A1* | 9/2022 | Okabe | G01S 15/12 |

* cited by examiner

VEHICLE DETERMINATION DEVICE

CROSS-REFERENCE TO RELATED APPLICATION

This application claims priority to Japanese Patent Application No. 2024-059662 filed on Apr. 2, 2024, incorporated herein by reference in its entirety.

BACKGROUND

1. Technical Field

The present disclosure relates to a vehicle determination device.

2. Description of Related Art

Hitherto, there is known a traffic light indication estimation system assuming, in a situation where a plurality of traffic lights to be recognized is detected, accurate estimation of a traffic light indication of a traffic light ahead in a traveling direction of a vehicle (see Japanese Unexamined Patent Application Publication No. 2021-018737 (JP 2021-018737 A)).

SUMMARY

However, the state of the traffic light is represented by a color or arrow indication of the illuminated traffic light and is represented without movement of an object etc. Therefore, when determining the state of the traffic light, only image information from a camera can be used in principle. It is difficult to improve the reliability of the determination in consideration of the possibility that an error occurs in the recognition of the image information due to an external factor such as backlight. For example, when the vehicle attempts to pass through an intersection with a traffic light and determination is made as to whether the vehicle can pass based only on the state of the traffic light, the determination is made using only the state of the traffic light based on the camera image. Thus, the reliability may decrease.

In addition, the recognition of the state of the traffic light based on the camera image is technically relatively high in difficulty level, and a limit is also assumed to improve the accuracy of the recognition of the state of the traffic light. Therefore, in the determination on the state of the traffic light, it is preferable to improve the accuracy of the determination in the entire system by using not only the recognition of the state of the traffic light based on the camera image but also other means in combination.

Therefore, the present disclosure provides a vehicle determination device capable of accurately determining whether a vehicle can pass through a traffic light when the vehicle attempts to pass through the traffic light.

The gist of the present disclosure is as follows.

A vehicle determination device according to a first aspect of the present disclosure includes:

a traffic light determination unit configured to determine whether a traffic light ahead of a vehicle indicates that the vehicle is passable through the traffic light;

an other-vehicle behavior determination unit configured to determine behavior of another vehicle present around the vehicle; and a passableness determination unit configured to, when determination is made that the traffic light indicates that the vehicle is passable through the traffic light, determine whether the vehicle is passable through the traffic light based on the behavior of the other vehicle present around the vehicle.

In the vehicle determination device according to the first aspect of the present disclosure, the passableness determination unit may be configured to determine that the vehicle is startable when the vehicle is stopped at the traffic light, determination is made that the traffic light indicates that the vehicle is passable through the traffic light, and determination is made that another vehicle that travels in the same direction as or in an opposite direction to a direction of the vehicle has started.

In the vehicle determination device according to the first aspect of the present disclosure, the passableness determination unit may be configured to determine that the vehicle is passable through the traffic light when the vehicle attempts to pass through the traffic light during traveling, determination is made that the traffic light indicates that the vehicle is passable through the traffic light, and determination is made that another vehicle that travels in the same direction as a direction of the vehicle does not decelerate by a predetermined value or more.

The present disclosure provides the vehicle determination device capable of accurately determining whether the vehicle can pass through the traffic light when the vehicle attempts to pass through the traffic light.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, some embodiments of the present disclosure will be described with reference to the drawings. However, these descriptions are intended to be merely exemplary of the preferred embodiments of the present disclosure and are not intended to limit the present disclosure to such specific embodiments.

Figure 1:
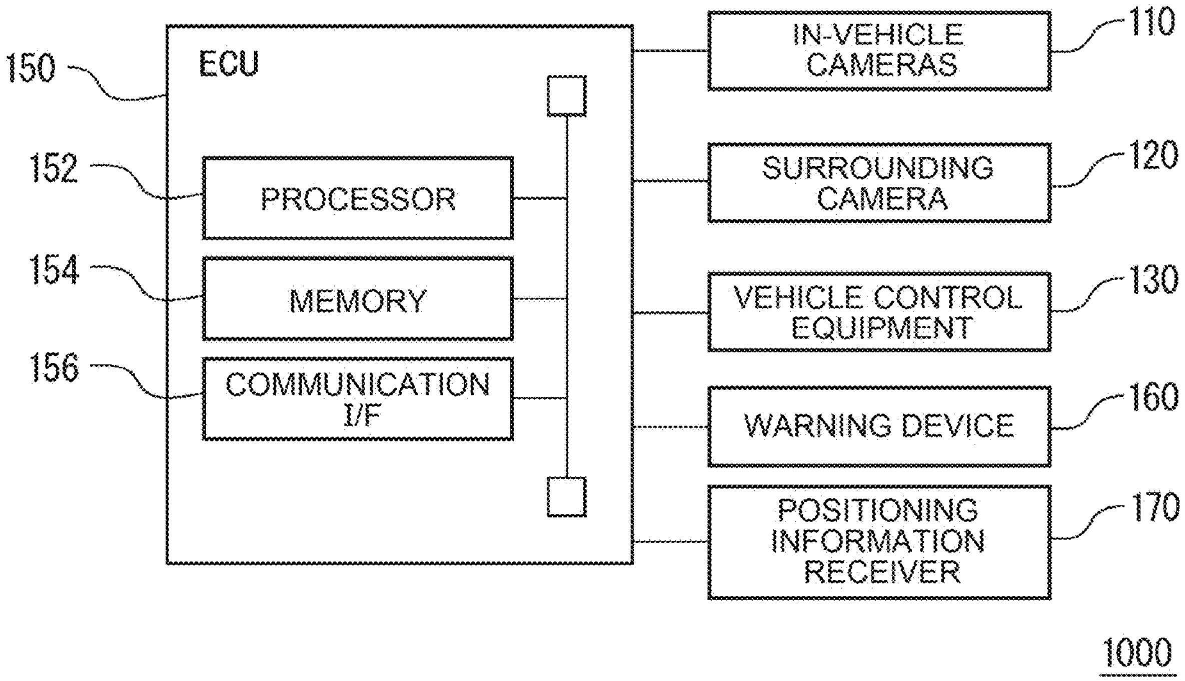
FIG. 1 is a schematic configuration diagram of a vehicle traveling assistance system 1000 according to one embodiment.

FIG. 1 is a schematic configuration diagram of a vehicle traveling assistance system 1000 according to an embodiment. The traveling assistance system 1000 is mounted on a vehicle such as an automobile. The traveling assistance system 1000 includes an in-vehicle camera 110, a surroundings monitoring sensor 120, a vehicle control device 130, an electronic control unit (ECU: Electronic Control Unit, hereinafter referred to as an ECU) 150, a warning device 160, and a positioning information receiver 170. Each of the in-vehicle camera 110, the surroundings monitoring sensor 120, the vehicle control device 130, ECU 150, the warning device 160, and the positioning information receiver 170 is communicably connected via an in-vehicle network compliant with a standard such as a controller area network (Controller Area Network (CAN)).

The in-vehicle camera 110 includes a two-dimensional detector configured by arrays of photoelectric transducers sensitive to visible light, such as CCD or C-MOS, and an imaging optical system that forms an image of an area to be imaged on the two-dimensional detector. The in-vehicle camera 110 captures an image of the surroundings of the vehicle (for example, in front of the vehicle) and generates an image representing the environment around the vehicle. The in-vehicle camera 110 may include a front camera, two left and right side cameras, and a rear camera. The in-vehicle camera 110 performs shooting every predetermined shooting cycle (for example, 1/30 seconds to 1/10 seconds). The in-vehicle camera 110 may be constituted by a stereo camera, or may be constituted so as to acquire a distance from the parallax of the left and right images to each structure on the image. Each time an image is generated, the in-vehicle camera 110 outputs the generated image to ECU 150 via the in-vehicle network.

The surroundings monitoring sensor 120 is a sensor for monitoring the surroundings of the vehicle. The surroundings monitoring sensor 120 includes, for example, a sensor such as a Lidar: Light Detection and Ranging or a Radar. The radar includes a front side radar sensor on the inside of the front bumper and a rear side radar sensor on the inside of the rear bumper.

The vehicle control device 130 is various devices related to vehicle control, and includes a driving device such as an internal combustion engine or an electric motor as a driving source for driving the vehicle, a transmission, a braking device for braking the vehicle, a steering device for turning the vehicle, and the like.

ECU 150 is an aspect of a vehicle determination device according to the present disclosure. ECU 150 includes a processor 152, memories 154, and a communication interface 156. The processor 152 has one or more CPU (Central Processing Unit) and its peripheral circuitry. The processor 152 may further include other arithmetic circuits, such as a logical operation unit, a numerical operation unit, or a graphics processing unit. The memory 154 includes, for example, a volatile semiconductor memory and a non-volatile semiconductor memory, and stores data related to the processing according to the present embodiment. The communication interface 156 has interface circuitry for connecting ECU 150 to the in-vehicle networking.

The warning device 160 includes a display device and a speaker. The display device includes, for example, a liquid crystal display (LCD), is provided in the vicinity of an instrument cluster, a dashboard, or the like, and displays and outputs an alert in response to an instruction from an ECU 150. In response to an instruction from ECU 150, the speaker outputs an alert by sound.

The positioning information receiver 170 acquires positioning information indicating a current position and an attitude of the vehicle. For example, the positioning information receiver 170 may be a GPS (Global Positioning System) receiver.

Figure 2:
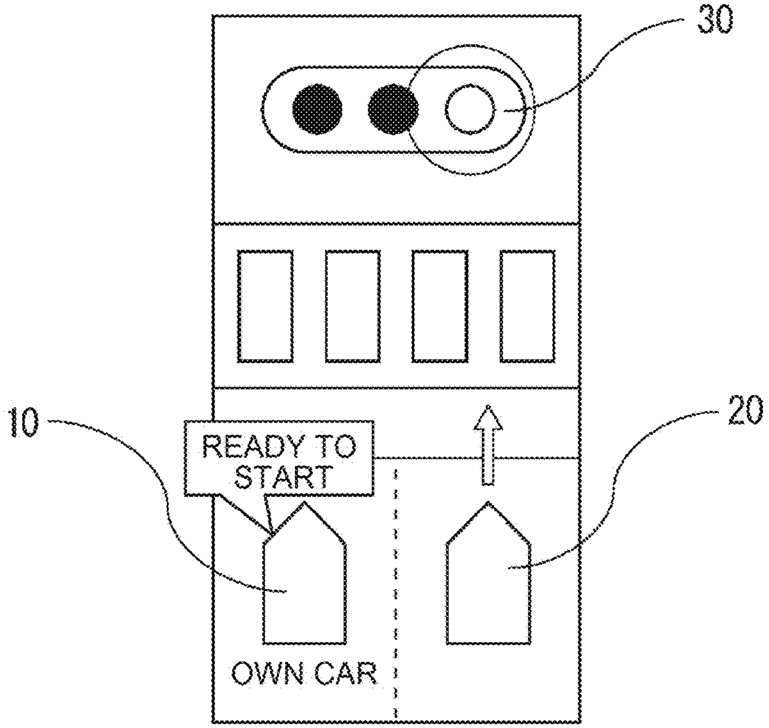
FIG. 2 is a schematic diagram showing a state in which the vehicle 10 is stopped on a road of two lanes on one side.

In the present embodiment, in the traveling assistance system 1000 that supports starting, stopping, acceleration/deceleration, steering, or the like of a vehicle, a scene that passes through a traffic light is supported. FIG. 2 is a schematic diagram showing a state in which the vehicle 10 is stopped on a road of two lanes on one side, and shows a state in which the color of the traffic light 30 in front of the vehicle 10 changes from red to blue. The vehicle 10 is equipped with the traveling assistance system 1000 illustrated in FIG. 1. As shown in FIG. 2, when the color of the traffic light 30 changes to blue, the other vehicle 20 that has stopped on the right side of the vehicle 10 starts.

The traveling assistance system 1000 determines whether or not the color of the traffic light 30 has changed from red to blue based on the image generated by the in-vehicle camera 110. Then, the traveling assistance system 1000 determines that the color of the traffic light 30 has changed from red to blue, and determines that the vehicle 10 can start when the other vehicle 20 that has stopped on the right side starts.

When it is determined whether or not the vehicle 10 can be started only by the fact that the color of the traffic light 30 has changed from red to blue, the determination of whether or not the vehicle can be started is performed using only the color change of the traffic light 30 based on the image of the in-vehicle camera 110. In this case, for example, in consideration of a possibility that an error occurs in the determination of the color of the traffic light 30 based on the image due to a factor such as backlight, there is a possibility that the reliability of the determination of whether or not the start is possible cannot be sufficiently secured.

In the present embodiment, the start of the vehicle 10 is permitted based on the behavior of the other vehicle 20 in addition to the determination of the state of the traffic light 30 based on the image of the in-vehicle camera 110. As a result, the reliability of the determination of whether or not the vehicle 10 can be started can be improved by taking into consideration not only the determination of the signal state by the image but also the behavior of the surrounding other vehicle 20. Specifically, even if it is determined that the color of the traffic light 30 has changed from red to blue, the vehicle 10 does not start unless the other vehicle 20 starts. Thus, even when there is an error in the determination of the color of the traffic light 30 based on the image, the reliability of the determination of whether or not the start is possible is ensured.

Figure 3:
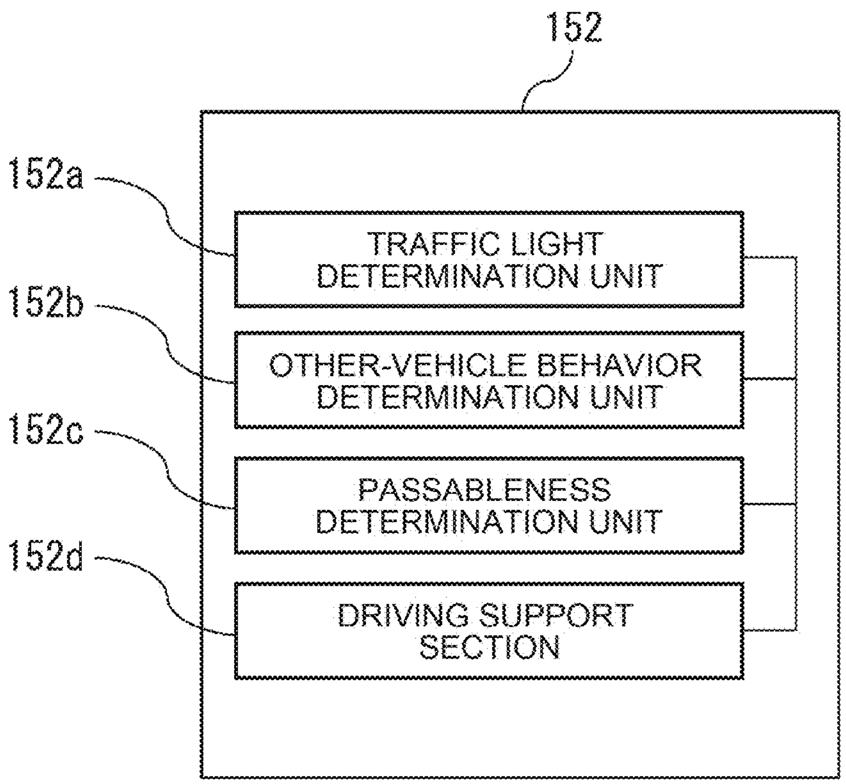
FIG. 3 is a schematic diagram illustrating functional blocks of a processor of an ECU.

FIG. 3 is a schematic diagram illustrating functional blocks of the processor 152 of ECU 150 for realizing the above-described processes. The processor 152 of ECU 150 includes a traffic light determination unit 152*a*, an other-vehicle behavior determination unit 152*b*, a passableness determination unit 152*c*, and a driving assistance unit 152*d*. These units included in the processor 152 are, for example, functional modules realized by a computer program running on the processor 152. That is, the functional blocks of the processor 152 are composed of the processor 152 and a program (software) for causing the processor to function. The program may be recorded in the memory 154 of ECU 150 or a recording medium connected from the outside. Alternatively, each of these units included in the processor 152 may be a dedicated arithmetic circuit provided in the processor 152.

The traffic light determination unit 152*a* determines the presence of the traffic light 30 in front of the vehicle 10 based on the images representing the front of the vehicle 10 generated by the in-vehicle camera 110, and further determines whether or not the traffic light 30 indicates that the vehicle 10 can pass. That is, the traffic light determination unit 152*a*, the traffic light 30, blue signal, yellow signal, red signal, straight arrow signal, right and left arrow signal, or yellow (or red) flashing signal, or determine whether or a combination thereof. Then, the traffic light determination unit 152*a* determines whether or not it indicates that the vehicle 10 can pass. At this time, the traffic light 30 is detected from the image by, for example, template matching between the template image and the image generated by the in-vehicle camera 110, and it is determined whether or not the traffic light 30 indicates that the vehicle 10 can pass. Alternatively, by inputting an image generated by the in-vehicle camera 110 to the identifier that has been subjected to machine learning for object detection, the traffic light 30 is detected from the image, and it is determined whether or not the traffic light 30 indicates that the vehicle 10 can pass.

Note that the traffic light determination unit 152*a* can use, for example, a segmentation classifier as the above-described classifier. The discriminator for segmentation is learned in advance, for example, from the input image, for each pixel of the image, for each type of object that may be represented in the pixel, so as to output the probability that the object is represented in the pixel, and to identify that the object whose probability is the maximum is represented. The traffic light determination unit 152*a* may use, as such an identifier, a deep neural network (DNN) having a convolutional neural network type (CNN) architecture for segmentation, such as Fully Convolutional Network (FCN), for example.

The other-vehicle behavior determination unit 152*b* determines the presence of another vehicle 20 existing in the vicinity of the vehicle 10 based on at least one of images representing the environment around the vehicle 10 generated by the in-vehicle camera 110 and information detected by the surroundings monitoring sensor 120, and determines the behavior of the other vehicle 20. Specifically, when the vehicle 10 is stopped by the traffic light 30, the other-vehicle behavior determination unit 152*b* determines whether or not the other vehicle 20 traveling in the same direction or in the opposite direction as the vehicle 10 has started. In addition, when the vehicle 10 is going to pass the traffic light 30, the other-vehicle behavior determination unit 152*b* determines whether or not the other vehicle 20 traveling in the same direction as the vehicle 10 has decelerated by a predetermined value or more. In the determination based on the in-vehicle camera 110 image, the other vehicle 20 is detected from the image by, for example, template matching between the template image and the image generated by the in-vehicle camera 110, and the distance from the vehicle 10 to the other vehicle 20 is acquired. Alternatively, in the determination based on the in-vehicle camera 110 image, the other vehicle 20 is detected from the image by inputting the image generated by the in-vehicle camera 110 to the identifier that is machine-learned for target detection, and the distance from the vehicle 10 to the other vehicle 20 is acquired. The discriminator may be configured in the same manner as described above. In the determination based on the information detected by the surroundings monitoring sensor 120, the distance from the vehicle 10 to the other vehicle 20 is acquired from the detected information of the other vehicle 20. Then, the behavior of the other vehicle 20 is determined based on the detected information of the other vehicle 20 and the distance from the vehicle 10 to the other vehicle 20.

Note that a plurality of other vehicles 20 may be provided. Further, the other vehicle 20 traveling in the same direction as the vehicle 10 or in the opposite direction may be a front and rear vehicle on the same lane as the vehicle 10, a vehicle on the other lane in the same traveling direction as the vehicle 10, a vehicle on an opposite lane, or a combination of these vehicles. In a case where the vehicle on the same lane as the vehicle 10 is the other vehicle 20, the vehicle 10 may not be positioned at the head. In the determination based on the in-vehicle camera 110 image, if there is a possibility that the reliability of the determination based on the front camera image is insufficient due to a factor such as backlight, the behavior of the other vehicle 20 may be determined based on the image of the side camera or the rear camera.

The passableness determination unit 152*c*, when it is determined that the traffic light 30 indicates that the vehicle 10 can pass by the traffic light determination unit 152*a*, the vehicle 10 based on the behavior of the other vehicle 20 present in the vicinity of the vehicle 10 to determine whether the passage of the traffic light 30 by.

Specifically, the vehicle 10 may be stopped by the traffic light 30. In this case, the passableness determination unit 152*c* determines that the traffic light 30 indicates that the vehicle 10 can pass by the traffic light determination unit 152*a*, and determines that the vehicle 10 can start when the other vehicle 20 traveling in the same direction or in the opposite direction as the vehicle 10 is determined to have started by the other-vehicle behavior determination unit 152*b*.

Note that there is a case where a preceding vehicle is present in front of the vehicle 10 and the preceding vehicle is not starting. In this case, even if the other vehicle 20 other than the preceding person in front of the vehicle 10 starts, the passableness determination unit 152*c* can determine to maintain the stopped state of the vehicle 10 without determining that the vehicle 10 can start.

In addition, the vehicle 10 may attempt to pass through the traffic light 30 while traveling. In this case, the passableness determination unit 152*c* determines that the traffic light 30 indicates that the vehicle 10 can pass by the traffic light determination unit 152*a*, and determines that the traffic light 30 can pass by the vehicle 10 when the other vehicle 20 traveling in the same direction as the vehicle 10 is not decelerated to a predetermined value or more by the other-vehicle behavior determination unit 152*b*. The deceleration equal to or more than the predetermined value may be such that the absolute value of the deceleration is equal to or more than the predetermined value. When the signal is passed, there is a possibility that the other vehicle 20 may decelerate to prepare for a change in the color of the signal or the like. Therefore, it is determined that the signal can pass when the other vehicle 20 is not decelerating by a predetermined value or more, and it is determined that the signal cannot pass when the other vehicle 20 is decelerating by a predetermined value or more. The deceleration of the predetermined value or more may be determined from the deceleration of the other vehicle 20, the difference in the vehicle speed between the vehicle 10 and the other vehicle 20, and the combination thereof, which are obtained from the relative distance between the vehicle 10 and the other vehicle 20.

The driving assistance unit 152*d* supports driving of the driver of the vehicle 10. The driving assistance unit 152*d* controls the vehicle control device 130 to support driving of the driver based on images representing the environment around the vehicle generated by the in-vehicle camera 110, information detected by the surroundings monitoring sensor 120, map information stored in the memory 154, and the like, and also controls outputting of the warning by the warning device 160.

When the vehicle 10 is stopped by the traffic light 30 and the passableness determination unit 152*c* determines that the vehicle 10 can start, the driving assistance unit 152*d* controls the vehicle control device 130 to start the vehicle 10. In addition, in this case, the driving assistance unit 152*d* may issue a warning indicating that the vehicle 10 can be started from the warning device 160 in order to prompt the vehicle 10 to start by a driver operation such as an accelerator operation or a switch operation.

When the passableness determination unit 152*c* cannot determine whether or not to start based on the behavior of the other vehicle 20, the driving assistance unit 152*d* may output a notification of the start of the vehicle 10 by operating the driver to prompt the start. The situation in which it is impossible to determine whether or not to start based on the behavior of the other vehicle 20 includes a situation in which the other vehicle 20 is not present in the vicinity of the vehicle 10, a situation in which the driver of the other vehicle 20 is not looking at the traffic light 30, and the like. Further, as a situation in which it is impossible to determine whether or not to start based on the behavior of the other vehicle 20, the other vehicle 20 is a succeeding vehicle of the vehicle 10, and is stopped in an attempt to secure an inter-vehicle distance with the vehicle 10, or the other vehicle 20 cannot start due to another traffic environment. These situations are obtained from the image representing the environment around the vehicle 10 generated by the in-vehicle camera 110 and the information detected by the surroundings monitoring sensor 120. In this case, it is preferable that the notification of the start of the vehicle 10 by the operation of the driver is notified after a predetermined period of time in which it is impossible to determine whether or not the start is possible based on the behavior of the other vehicle 20.

In addition, when the vehicle 10 is going to pass through the traffic light 30, the driving assistance unit 152*d* controls the vehicle control device 130 such that the vehicle 10 passes through the traffic light 30 when the passableness determination unit 152*c* determines that the traffic light 30 can pass through the vehicle 10. In addition, in this case, the driving assistance unit 152*d* may output a warning indicating that the traffic light 30 can be passed from the warning device 160 in order to prompt the driver to drive the vehicle 10.

In determining whether or not the vehicle 10 can be started based on the behavior of the other vehicle 20 traveling in the same direction as the vehicle 10, the passableness determination unit 152*c* may determine whether or not the vehicle 10 can be started, including the behavior of the other vehicle 20 traveling in the right and left turn limited lane. Further, in the determination of whether or not the vehicle 10 can be started based on the behavior of the other vehicle 20 traveling in the same direction as the vehicle 10, the passableness determination unit 152*c* may determine whether or not the vehicle 10 can be started with respect to the behavior of the other vehicle 20 traveling in the right-left turn limited lane as a non-target.

In the case of determining whether or not the vehicle 10 can be started including the behavior of the other vehicle 20 traveling in the left-right turn limited lane, in the traffic light 30 having an arrow signal, the arrow signal can be determined from the shape as compared with the color of a normal signal, and the reliability of the determination opportunity and the determination can be further secured. For example, in the traffic light 30 in which the blue arrow of the right turn is displayed, when the traffic light determination unit 152*a* determines that the color of the traffic light 30 is a blue signal and the other vehicle 20 that has stopped on the straight lane starts, the passableness determination unit 152*c* may determine that the vehicle 10 can start. On the other hand, in this case, when the other vehicle 20 of the right turn dedicated lane starts, there is a possibility that the traffic light determination unit 152*a* actually has determined that the red signal is a blue signal, and therefore, the passableness determination unit 152*c* may determine that the vehicle 10 cannot start. Whether the vehicle 10 or the other vehicle 20 is located in the straight lane or the right-turn dedicated lane (or the left-turn dedicated lane) is determined by fitting the position of the vehicle 10 or the other vehicle 20 to a high-definition map in which information such as the straight lane or the right-and-left-turn dedicated lane is represented in detail. The high definition maps may be stored in ECU 150 memories 154. The position of the other vehicle 20 is determined from the position of the vehicle 10 and the relative position of the other vehicle 20 with respect to the vehicle 10.

In some cases, the traffic light determination unit 152*a* determines that the color of the traffic light 30 is a red signal, and the traffic light 30 determines that a straight blue arrow is displayed. In this case, when the other vehicle 20 that has stopped in the straight lane starts, the passableness determination unit 152*c* may determine that the vehicle 10 can start. On the other hand, in this case, when the other vehicle 20 of the right turn dedicated lane starts, there is a possibility that the traffic light determination unit 152*a* erroneously determines the direction indicated by the blue arrow, and therefore the passableness determination unit 152*c* may determine that the vehicle 10 cannot start.

In some cases, the traffic light determination unit 152*a* determines that the color of the traffic light 30 is a red signal, and the traffic light 30 determines that a straight blue arrow and a right-turn blue arrow are displayed. In this case, when the other vehicle 20 that has stopped in the straight lane starts, the passableness determination unit 152*c* may determine that the vehicle 10 can start. Further, in this case, when the other vehicle 20 of the right turn dedicated lane starts, it is unlikely that the traffic light determination unit 152*a* erroneously determines the direction indicated by the blue arrow, and therefore, the passableness determination unit 152*c* may determine that the vehicle 10 can start.

On the other hand, in some cases, whether or not the vehicle 10 can be started is determined to be excluded from the target of the behavior of the other vehicle 20 traveling in the right and left turn limited lane. In this case, since the determination based on the other vehicle 20 that is stopped in the right and left turn limited lane is not performed with respect to the state of the traffic light 30 in which only the rectilinear lane is permitted to start, such as a rectilinear arrow signal, the reliability of the determination of whether or not to start can be improved.

In the case of determining whether or not the traffic light 30 is allowed to pass while the vehicle 10 is traveling, there is a possibility that the other vehicle 20 in the right and left turn lanes decelerates due to the oncoming vehicle, the crossing pedestrian, or the like even if the traffic light 30 is blue. Therefore, the movement of the other vehicle 20 in the right and left turn lanes is excluded from the determination of whether or not passage is possible.

Figure 4:
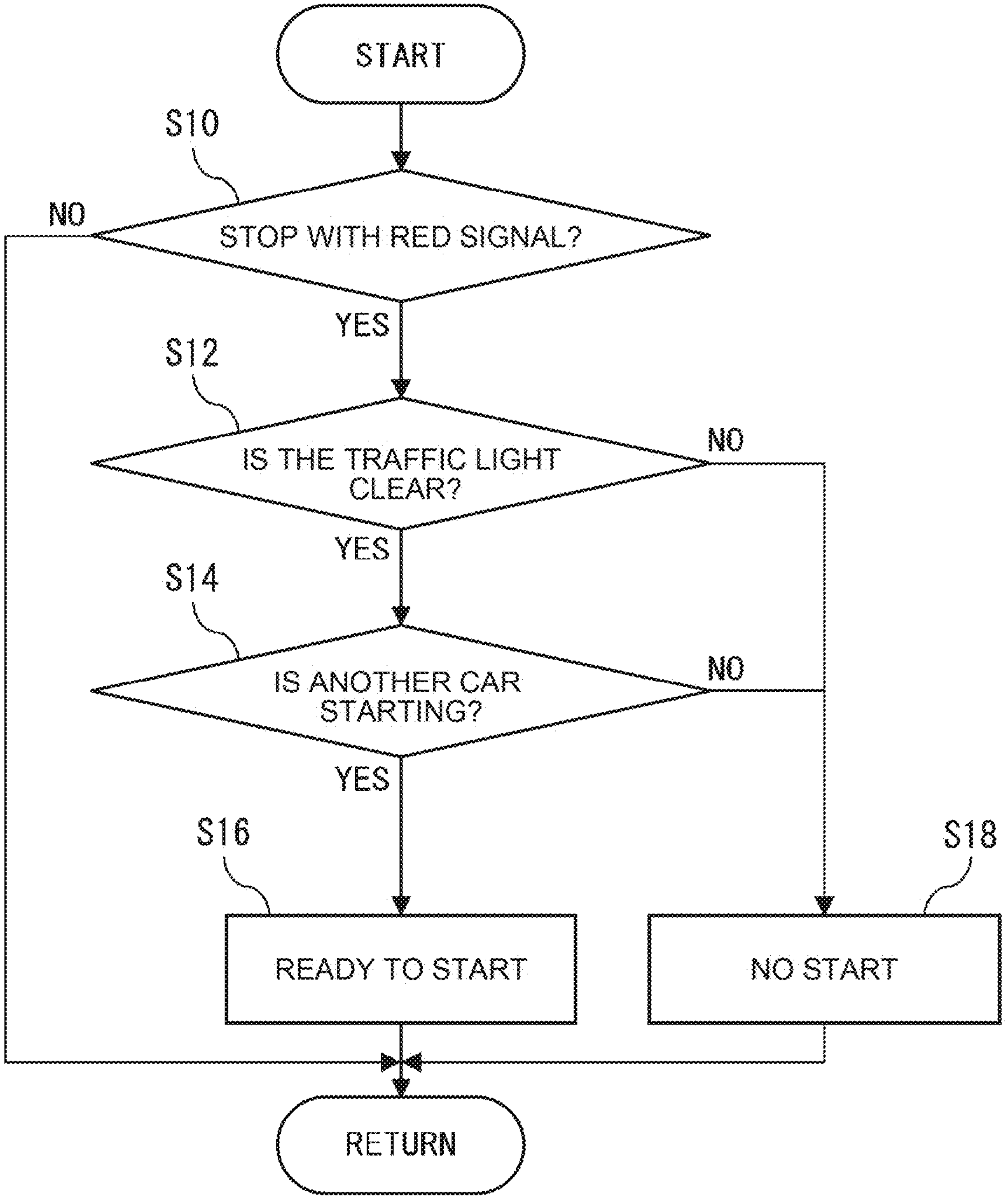
FIG. 4 is a flow chart showing a process performed by the processor of ECU at every predetermined control cycle.

FIG. 4 is a flow chart showing a process performed by the processor 152 of ECU 150 for each predetermined control cycle, and shows a process when the vehicle 10 is stopped by a red signal. First, it is determined whether or not the vehicle 10 is stopped by a red signal (step 10). When the vehicle 10 is stopped by the red signal, the traffic light determination unit 152*a* determines whether or not the traffic light 30 indicates that the vehicle 10 can pass (step 12).

When it is determined that the traffic light 30 indicates that the vehicle 10 can pass through S12, the other-vehicle behavior determination unit 152*b* determines whether or not the other vehicle 20 traveling in the same direction or in the opposite direction as the vehicle 10 has started (S14). When it is determined in S14 that the other vehicle 20 traveling in the same direction as the vehicle 10 or in the opposite direction has started, the passableness determination unit 152*c* determines that the vehicle 10 can start (S16).

On the other hand, when it is determined in step 12 that the traffic light 30 does not indicate that the vehicle 10 can pass, the passableness determination unit 152*c* determines that the vehicle 10 cannot start (S18). Alternatively, when it is determined that the other vehicle 20 traveling in the same direction or in the opposite direction as the vehicle 10 is not starting on S14, the passableness determination unit 152*c* determines that the vehicle 10 cannot start (S18).

After S16, S18, the process in this control cycle ends. In addition, when the vehicle 10 is not stopped by the red signal in S10, the process in this control cycle ends.

Figure 5:
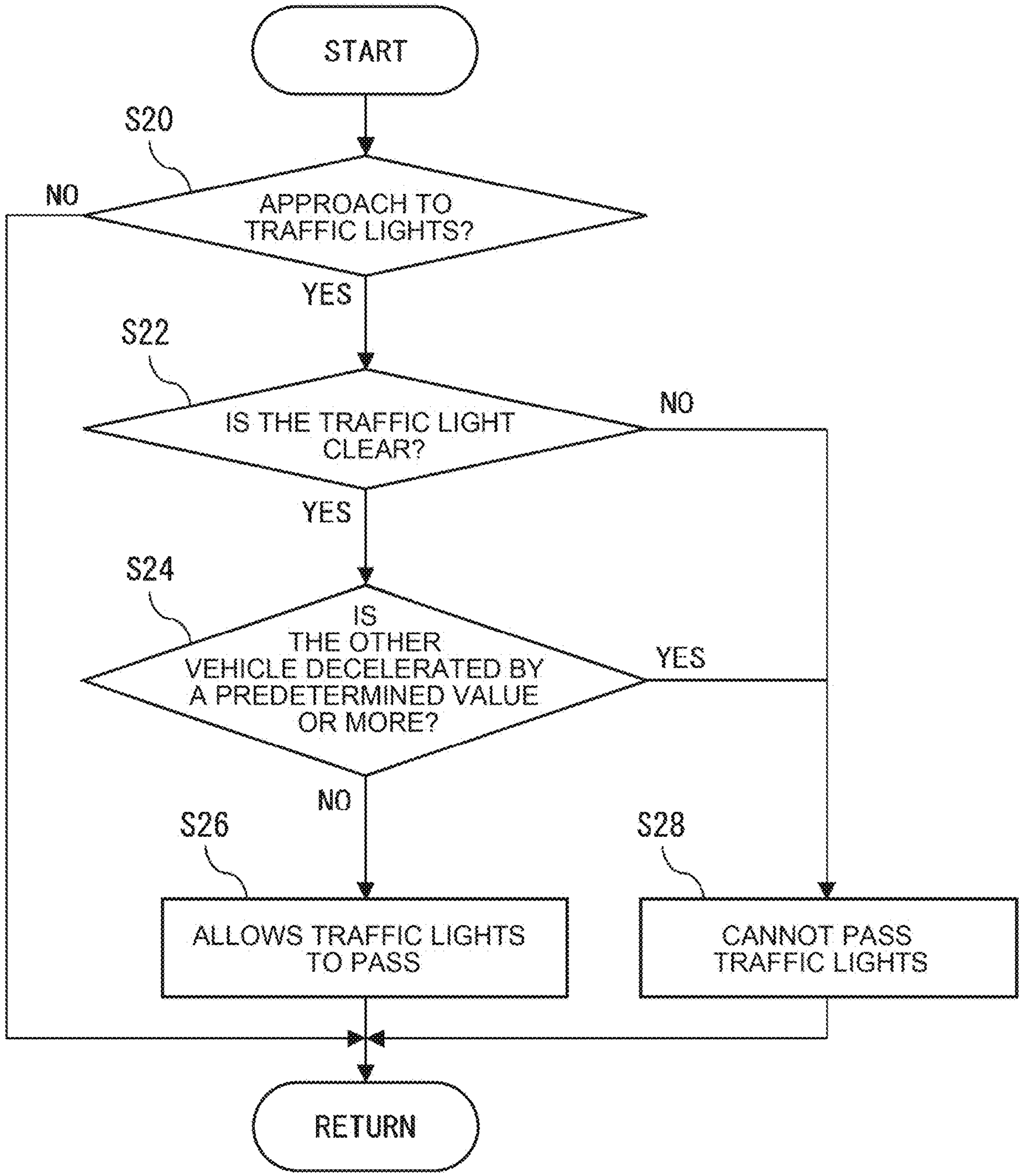
FIG. 5 is a flow chart illustrating a process performed by the processor of ECU at predetermined control cycles.

FIG. 5 is a flow chart showing a process performed by the processor 152 of ECU 150 at every predetermined control cycle, and shows a process when the vehicle 10 approaches the traffic light 30 while traveling. First, the traffic light determination unit 152*a* determines whether or not the traffic light 30 in front of the vehicle is approaching while the vehicle 10 is traveling (step 20). If it is determined in S20 that the traffic light 30 is approaching, the traffic light determination unit 152*a* determines whether or not the traffic light 30 indicates that the vehicle 10 can pass (step 22).

When it is determined that the traffic light 30 indicates that the vehicle 10 can pass through S22, the other-vehicle behavior determination unit 152*b* determines whether or not the other vehicle 20 traveling in the same direction as the vehicle 10 has decelerated to a predetermined value or more (S24). When it is determined in S24 that the other vehicle 20 traveling in the same direction as the vehicle 10 has not decelerated by a predetermined value or more, the passableness determination unit 152*c* determines that the traffic light 30 can be passed by the vehicle 10 (S26). In S22, it is determined that the traffic light 30 indicates that the vehicle 10 can pass, but the reliability of the determination may be expected to be relatively low. In this case, in S26, it may be determined that the driver is allowed to pass through, and an alert to alert the driver may be outputted.

On the other hand, in some cases, the traffic light 30 does not indicate that the vehicle 10 can pass through in S22, or the other vehicle 20 traveling in the same direction as the vehicle 10 in S24 decelerates by a predetermined value or more. In these cases, the passableness determination unit 152*c* determines that the traffic light 30 cannot be passed by the vehicle 10 (S28).

After S26, S28, the process in this control cycle ends. When the vehicle 10 is not approaching the traffic light 30 in S20, the process in this control cycle ends.

As described above, according to the present embodiment, it is possible to accurately determine whether or not the traffic light 30 can pass through the vehicle 10 in accordance with not only the state recognition of the traffic light 30 by the in-vehicle camera 110 but also the behavior of the surrounding other vehicle 20.

What is claimed is:

1. A vehicle determination device mounted on a first vehicle, the vehicle determination device comprising an electronic control unit (ECU) configured to be communicably connected to an in-vehicle camera, a surroundings monitoring sensor, and a vehicle control device that are included in the first vehicle, the vehicle control device including an electric motor and a brake, wherein the ECU includes a processor configured to:

determine whether the first vehicle is stopped due to a red signal of a traffic light ahead of the first vehicle;

determine whether the traffic light indicates that the first vehicle is passable through the traffic light based on information on the traffic light acquired from the in-vehicle camera, in response to determining that the first vehicle is stopped due to the red signal;

acquire information on a second vehicle present around the first vehicle from at least one of the in-vehicle camera or the surroundings monitoring sensor in response to determining that the traffic light indicates that the first vehicle is passable through the traffic light;

determine whether the second vehicle that travels in a same direction as or in an opposite direction to the first vehicle has started based on the acquired information on the second vehicle; and control the vehicle control device to start the first vehicle in response to determining that the second vehicle has started.

2. The vehicle determination device according to claim 1, wherein the processor is configured to:

determine whether the second vehicle present in an opposite lane relative to a lane where the first vehicle is stopped has started in the opposite direction to the first vehicle based on the acquired information on the second vehicle; and control the vehicle control device to start the first vehicle in response to determining that the second vehicle present in the opposite lane has started.

3. The vehicle determination device according to claim 1, wherein the second vehicle is a vehicle other than a preceding vehicle located in front of the first vehicle, the processor is configured to determine whether the second vehicle that travels in the same direction as the first vehicle has started based on the acquired information on the second vehicle, and the processor is further configured to:

determine whether the preceding vehicle has started in response to determining that the second vehicle that travels in the same direction as the first vehicle has started; and control the vehicle control device to maintain the first vehicle in a stopped state in response to determining that the preceding vehicle has not started.

4. The vehicle determination device according to claim 1, wherein the processor is further configured to:

acquire a distance between the first vehicle and the second vehicle based on an image generated by the in-vehicle camera or information detected by the surroundings monitoring sensor; and determine whether the second vehicle has started based on the acquired distance.

5. A vehicle traveling assistance system mounted on a first vehicle, comprising:

an in-vehicle camera configured to capture an image of surroundings of the first vehicle;

a surroundings monitoring sensor configured to monitor the surroundings of the first vehicle;

a vehicle control device including an electric motor and a brake; and an electronic control unit (ECU) including a processor configured to:

determine whether the first vehicle is stopped due to a red signal of a traffic light ahead of the first vehicle;

determine whether the traffic light indicates that the first vehicle is passable through the traffic light based on information on the traffic light acquired from the in-vehicle camera, in response to determining that the first vehicle is stopped due to the red signal;

acquire information on a second vehicle present around the first vehicle from at least one of the in-vehicle camera or the surroundings monitoring sensor in response to determining that the traffic light indicates that the first vehicle is passable through the traffic light;

determine whether the second vehicle that travels in a same direction as or in an opposite direction to the first vehicle has started based on the acquired information on the second vehicle; and control the vehicle control device to start the first vehicle in response to determining that the second vehicle has started.

* * * * *